United States Patent
Cole

(10) Patent No.: US 7,242,007 B2
(45) Date of Patent: Jul. 10, 2007

(54) SMALL-GAP LIGHT SENSOR

(75) Inventor: Barrett E. Cole, Bloomington, MN (US)

(73) Assignee: Honeywell International Inc., Morristown, NJ (US)

( * ) Notice: Subject to any disclaimer, the term of this patent is extended or adjusted under 35 U.S.C. 154(b) by 211 days.

(21) Appl. No.: 10/957,376

(22) Filed: Oct. 1, 2004

(65) Prior Publication Data
US 2006/0071288 A1 Apr. 6, 2006

(51) Int. Cl.
*G01T 1/18* (2006.01)
(52) U.S. Cl. ..................................... 250/374
(58) Field of Classification Search ............... 250/374
See application file for complete search history.

(56) References Cited

U.S. PATENT DOCUMENTS

| | | | |
|---|---|---|---|
| 4,823,114 A | | 4/1989 | Gotisar |
| 4,882,573 A | | 11/1989 | Leonard et al. |
| 5,294,789 A | * | 3/1994 | Kruger .................... 250/214.1 |
| 5,349,194 A | | 9/1994 | Wuest et al. |
| 5,500,531 A | * | 3/1996 | Bu ............................. 250/372 |
| 2002/0003201 A1 | * | 1/2002 | Yu ............................ 250/208.1 |
| 2004/0235299 A1 | * | 11/2004 | Srivastava et al. .......... 438/689 |
| 2005/0082256 A1 | * | 4/2005 | Honda et al. ................. 216/67 |

OTHER PUBLICATIONS http://www.specpointsystems.com/products, Setpoint Systems Development, Inc.—Products, 2 pages, printed Jul. 12, 2004.
http://www.hpk.co.jp/Eng/products/etd/uvtrone/uvtrone.htm, Flame Sensor (UV TRON), 2 pages, printed Jul. 12, 2004.
Hamamatsu, Flame Sensor UV TRON R2868, "Quick Detection of Flame from Distance, Compact UV Sensor with Hight Sensitivity and Wide Directivity, Suitable for Flame Detectors and Fire Alarms" 2 pages Mar. 1998.

* cited by examiner

*Primary Examiner*—David Porta
*Assistant Examiner*—Marcus Taningco
(74) *Attorney, Agent, or Firm*—Kris T. Fredrick

(57) ABSTRACT

A sensor having a light detector with a small gap between the cathode and anode to enable a high pressure cavity resulting in a long lifetime of the detector due to insignificant sputtering from the cathode and subsequent minimal burying of the noble gas in the cavity. The detector may be made with MEMS technology and its techniques. The sensor may contain an array of light detectors. Some of the detectors may be UV detectors.

49 Claims, 3 Drawing Sheets

SMALL-GAP LIGHT SENSOR

BACKGROUND

The invention relates to sensors and particularly to sensors having MEMS structures. More particularly, the invention relates to light sensors having MEMS structures.

SUMMARY

The present invention may be a multi-wafer tube-based light sensor having an exceptionally small gap for discharge and a significantly high pressure in the cavity.

DESCRIPTION

The present sensor 10 is a MEMS (micro electro mechanical systems) device fabricated as a light detector. This detector may be used for the detection of infrared (IR), visible and ultraviolet (UV) light, depending on the materials used in its structure. The illustrative example described here may be a UV light detector. It may be used for flame detection and other applications having UV attributes. Related art UV detection tubes are bulky, fragile, and have limited lifetimes. The present MEMS detector may be miniaturized, robust, and have a long lifetime. The present MEMS detector may cost significantly less to build than the related art detection tubes. The present detector may be built with MEMS assembly techniques. The invention may be regarded as a tube type device despite its containment in a MEMS solid state enclosure. It may have other applications besides UV detection.

A typical UV sensor tube may have relatively large volume, e.g., 9000 cubic millimeters ($mm^3$). One of the concerns is the lifetime of the respective tube which may be limited due to the consumption of neon gas in the tube. The consumption of neon may be due to the sputtering of a cathode material which buries the neon. Such tube may operate with a spacing of about 500 microns between the anode and cathode in a cavity having a pressure of about 100 Torr. The discharge gas composition may include neon with about 15 percent of composition being $H_2$. Other noble gases besides neon may be used. The addition of $H_2$ may reduce the metastables which are secondary discharges that may occur during and/or after a primary discharge between the cathode and anode in the cavity.

Figure 3:
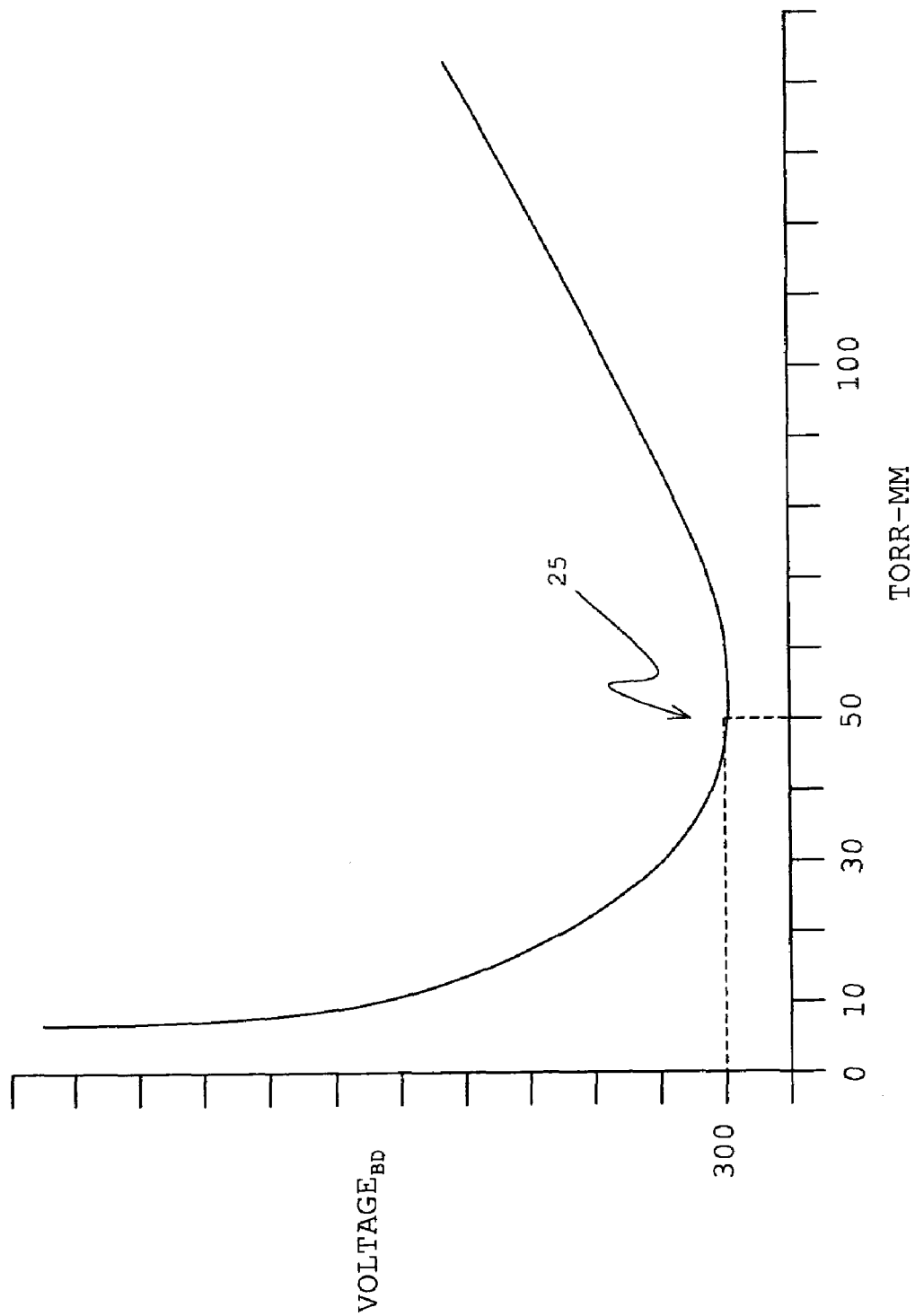
FIG. 3 is a graph of the sensor cavity breakdown voltage versus the product of the pressure of the cavity and the distance of the cathode and anode spacing.

The cathode-to-anode spacing may be made around 125 microns in the present device. Fabrication with MEMS technology makes such a small gap possible. Minimum gaps of other tubes in the art may be about four times larger. Relative to the other UV tubes, the internal cavity pressure may be raised about four times from, for instance, 100 Torr to about 400 Torr. The four-fold pressure increase and the four-fold reduction in the cathode-to-anode gap keep the tube cavity conditions at a Paschen point 25 of the same breakdown or discharge voltage, as shown in the graph of FIG. 3. It may be advisable to have a design that keeps the point within 20 percent of the original Paschen point. The sputter rate of a cathode in a device may have a relationship of $1/P^5$ where P is pressure of the gas in the cavity. This relationship may vary among different structures of the device. However, for an illustrative example, if the pressure is increased by approximately four times, the sputtering rate of the cathode material may be reduced to 1/1024 of the rate under the same pressure. Further, increasing volume of the cavity makes room for more neon and consequently may proportionally increase the lifetime of the tube.

Figure 1:
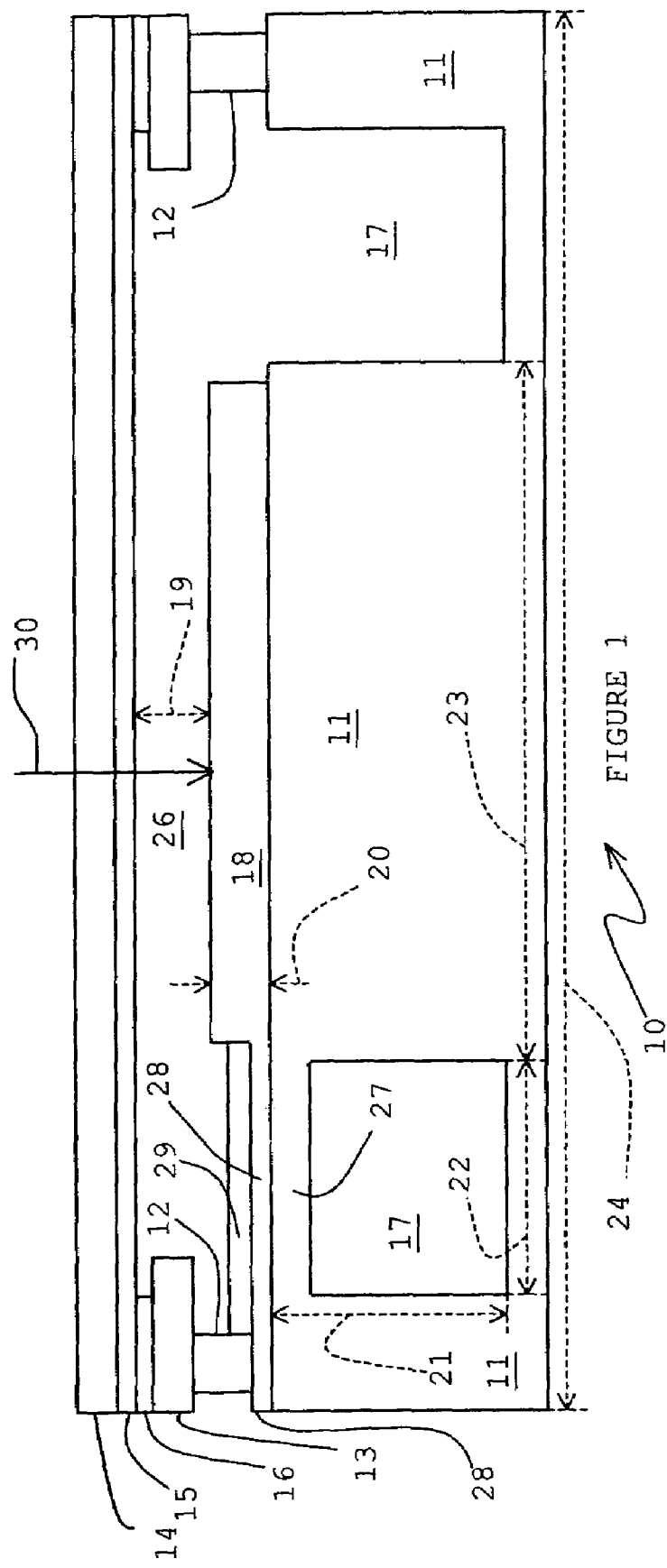
FIG. 1 is a side cross-section view of the sensor.

FIG. 1 shows a cross-section view of the MEMS tube 10. The base or substrate 11 may be fabricated from a fused silica. On the fused silica base 11 may be a frit 12 formed as a seal between a fused silica spacer 13 and base 11. A top 14 may have an anode 15 formed on a bottom surface of the top 14. Anode 15 may be situated on a peripheral seal 16 which in turn is situated on the spacer 13. This seal 16 may effectively hold top layer 14 in place, though with the thin anode layer 15 in between, to form a cavity 26 between a cathode 18 and anode 15 of the tube 10. The anode may be a metal grid with openings so that light 30 may enter through the fused silica top layer 14 and the anode 15 into the cavity. Or anode 15 may be a material that is conductive, and is transparent or transmissive relative to light 30 to be detected by sensor 10. Deposited or formed on at the center of the substrate or base 11 of tube 10 may be the cathode 18. Cathode 18 may have a distance 19 from anode 15 which may be about 125 microns. Other tube 10 designs may result in other magnitudes for distance 19. A thickness 20 of cathode 18 composed of tungsten may be about one micron. Thickness 20 may be varied for other cathode materials. Cathode materials may include tungsten, copper, nickel, gold, silver, nickel-iron, barium oxide, cesium, hafnium, molybdenum, and the like. The seal 16 between anode 15 and spacer 13 may be a Eutectic gold/silicon seal, or seal 16 may be of some appropriate insulative material.

The cathode 18 material may be selected to provide a long wavelength limit of the detector 10 spectral response. The cathode material may photo emit electrons below a certain wavelength (i.e., a photo emission threshold). The window (i.e., top 14 and anode 15) of the detector 10 may provide the short wavelength limit of the detector spectral response. However, the window may also have a filter that limits some of the long wavelength radiation or light impinging the detector. Thus, the kinds of materials used for the top 14, anode 15 and cathode 18 may be selected to determine the spectral response of the detector.

A trench 17 may be formed around the cathode 18 to add more cavity volume to cavity 26. A result of the trench 17 may be an island or mesa-like structure that supports the cathode 18. A bridge 27 may be formed across the trench 17. On bridge 27 may be a conductor 28 connecting cathode 18 to the periphery of base or substrate 11 for connection purposes outside of the cavity of tube 10. The peripheral seal 12 may be situated over or formed across conductor 28. On the top of conductor 28 may be formed a thin glass or other insulative coating 29 from cathode 18 to the seal 12 to hinder possible shorting from the cathode 18 with anode 14 inside the cavity due to a possible accumulation of metal sputter from the cathode 18 during the operational lifetime of the device 10. Spacer 13, situated on seal 12, may likewise have electrical insulative properties. Thus, cathode 18 and anode 15 may be connected externally outside of the cavity of tube along with keeping the cavity hermetically sealed.

Relative to the cathode 18, at standard pressure of 100 Torr, 25 microns of copper may provide an adequate lifetime, for example, 10,000 hours. For that lifetime, only about one micron of tungsten may be sufficient. Tungsten may be regarded as sputtering less material than nickel, under the same cavity and electrical conditions, by a factor of about 20. Copper may sputter more than nickel. It is fair to conclude that copper sputters about 25 times greater than tungsten. The sputter rate at a higher pressure may be reduced by up to $R^n$, where "R" is the ratio of the pressure increase and "n" is power of R, and as applied with the above-noted relationship, $4^5=1024$. Thus, the needed thickness for the tungsten cathode may be less than one micron.

Various factors may play a part in the material and thickness of the cathode. For instance, if the sputter rate is reduced by about 1000 times, then neon burial may be reduced by about 1000 times due to the four-fold increase of the cavity pressure to about 400 Torr. Thus, for a similar lifetime of the tube, which is dependent on the presence of the neon, the required volume for the neon (or other noble gas) may be about 1000 times less than the volume of the typical related art tube.

In the case where a typical UV tube may have a volume of about 9000 mm³ at a pressure of 100 Torr and an anode-to-cathode distance of about 500 microns, the normal lifetime of such tube may be about 10,000 hours. For the new and present tube 10, having an increase of pressure to 400 Torr and a decrease of distance or gap between the anode and cathode to about 125 microns, the volume of the tube may be reduced by a factor of 1000 down to 9 mm³ for a similar lifetime in view of the above-noted information.

Figure 2:
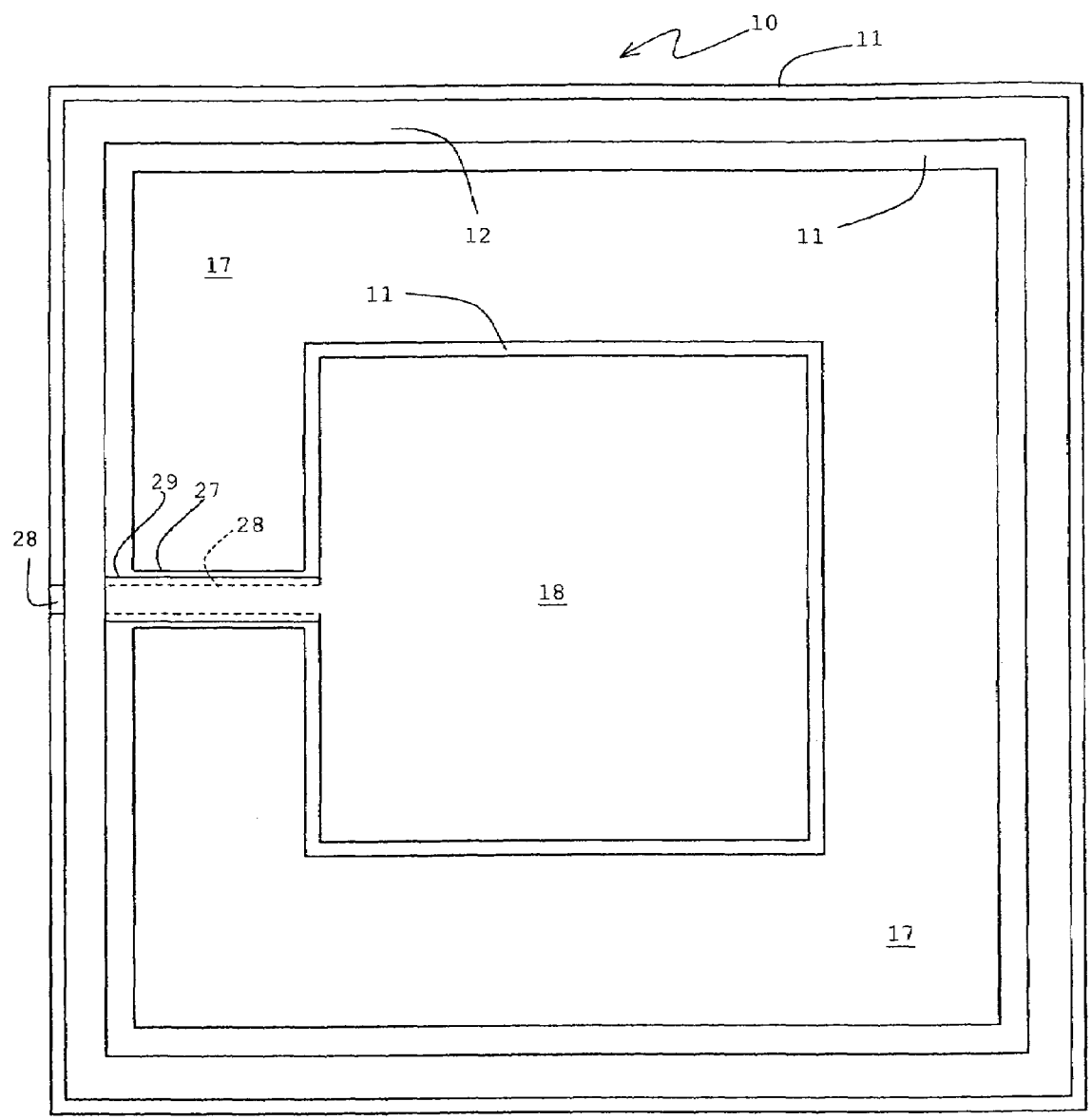
FIG. 2 is a top cross-section view of the sensor.

FIGS. 1 and 2 show the layout of device 10 relative to cavity 26. Without the trench or channel 17, the cavity for the noble gas would have dimensions of approximately 5 mm×5 mm×0.125 mm, resulting in a volume of about 3 mm³. Trench 17 may add more volume to a total tube cavity volume. For instance, looking at the Figures, one may note the dimensions 21, 22, 23 and 24 to be 1, 1, 3 and 6 millimeters (mm), respectively. Thus, trench 17 could add about 16 mm³, i.e., ((5 mm×5 mm)−(3 mm×3 mm))×1 mm≈16 mm³. The resultant volume of the tube cavity may be about 19 mm³. FIGS. 1 and 2 are not necessarily drawn to scale.

Although the invention has been described with respect to at least one illustrative embodiment, many variations and modifications will become apparent to those skilled in the art upon reading the present specification. It is therefore the intention that the appended claims be interpreted as broadly as possible in view of the prior art to include all such variations and modifications.

What is claimed is:

1. A light detector comprising:
a substrate having a trench formed therein;
a first conductive layer formed on a first surface of the substrate;
a top layer having a first surface; and
a second conductive layer formed on the first surface of the top layer; and
wherein:
the top layer is attached to the substrate;
the first conductive layer and the second conductive layer are situated in a cavity, the cavity having a pressure greater than 100 Torr;
the trench is contiguous with the cavity;
the top layer is significantly transparent to light; and
the second conductor is significantly transparent to light.

2. The detector of claim 1, further comprising a noble gas in the cavity.

3. The light detector of claim 1, wherein:
the first conductive layer is a cathode; and
the second conductive layer is an anode.

4. The detector of claim 3, wherein:
the distance between the cathode and the anode is less than 200 microns; and
the pressure of the cavity is greater than 250 Torr.

5. The detector of claim 4, wherein the detector is fabricated with MEMS technology.

6. The detector of claim 5, wherein:
a pressure in the cavity is x; and
a distance between the cathode and anode is y; and
a product of x and y is approximately equal to a Paschen value of a discharge voltage between the cathode and the anode.

7. The detector of claim 6, wherein the Paschen point has a value between 25 and 75 Torr-mm.

8. A light detector comprising:
a substrate having a first conductive layer;
a spacer layer situated on a perimeter of the substrate;
a top layer having first surface situated on the spacer layer; and
a second conductive layer formed on the first surface of the top layer; and
wherein the top layer and the second conductive layer are significantly transparent to light, wherein a trench and a space are formed between the first and second conductive layers forming a cavity having a pressure x; wherein a distance between the cathode and anode is y, and a product of x and y is within 20 percent of a Paschen point of a discharge voltage between the first conductive layer and the second conductive layer.

9. The detector of claim 8, wherein the distance between the first and second conductive layers is less than 200 microns.

10. The detector of claim 9, wherein the detector is fabricated with MEMS technology.

11. The detector of claim 10, wherein a pressure of a noble gas within the cavity is greater than 250 Torr.

12. The detector of claim 8, wherein the Paschen point has a value between 25 and 75 Torr-mm.

13. The detector of claim 12, wherein the Paschen point has a value between 45 and 55 Torr-mm.

14. A light detector comprising:
a substrate having a first conductive layer situated on about a center portion of a first surface of the substrate, the substrate having a trench formed therein at least partially surrounding the center portion;
a spacer situated on a perimeter of the first surface of the substrate;
a top layer having first surface; and
a second conductive layer formed on the first surface of the top layer; and
wherein the top layer is situated on the spacer to form a cavity containing the first and second conductive layers, the cavity being fluid communication with the trench.

15. The detector of claim 14, wherein the detector is fabricated with MEMS technology.

16. The detector of claim 14, wherein the trench is formed in the substrate between the perimeter of the first surface and the first conductive layer on the first surface of the substrate.

17. The detector of claim 16, wherein the trench is a part of the cavity.

18. The detector of claim 17, wherein the top layer and the second conductive layer are significantly ultraviolet transparent.

19. The detector of claim 18, further comprising a noble gas in the cavity.

20. The detector of claim 19, wherein:
a pressure in the cavity is x; and
a distance between the cathode and anode is y; and
a product of x and y is approximately equal to a Paschen value of a discharge voltage between the cathode and the anode.

21. The detector of claim 20, wherein the Paschen point has a value between 25 and 75 Torr-mm.

22. The detector of claim 21, wherein the Paschen point has a value between 45 and 55 Torr-mm.

23. The detector of claim 20, wherein the pressure is greater than 200 Torr and the distance between the cathode and anode is less than 125 microns.

24. The detector of claim 19, wherein the first conductive layer comprises a conductive material selected from a group consisting of tungsten, copper, nickel, gold, silver, nickel-iron, barium oxide, cesium, hafnium, molybdenum, and the like.

25. The detector of claim 24, wherein:
the first conductive layer is a cathode; and
the second conductive layer is an anode.

26. The detector of claim 25, wherein:
the distance between the cathode and the anode is less than 200 microns; and
the pressure of the gas in the cavity is greater than 250 Torr.

27. The detector of claim 26, wherein the noble gas is neon.

28. The detector of claim 27, further comprising $H_2$ in the cavity.

29. The detector of claim 25, wherein the anode is a grid.

30. The detector of claim 29, wherein the cathode comprises tungsten.

31. The detector of claim 14, wherein a volume of the cavity is less than 1000 $mm^3$.

32. The detector of claim 31, wherein the volume of the cavity is greater than 19 $mm^3$.

33. A method for detecting light with a miniature sensor having a long lifetime comprising:
forming a cathode on the substrate; and
forming a cavity by providing a top layer having an anode on the substrate; and
wherein:
the cavity comprises a noble gas at a pressure greater than 200 Torr; and
the cathode and anode have a spacing less than 250 microns; and
the cavity is formed with MEMS technology.

34. The method of claim 33, wherein the top layer and anode permit the passage of ultra-violet light into the cavity.

35. The method of claim 34, wherein a certain magnitude of ultra-violet light in the cavity may cause an electrical discharge between the cathode and anode.

36. The method of claim 35, wherein the cavity comprises:
a volume between the anode and the cathode; and
a trench in the substrate around the cathode.

37. The method of claim 36, wherein;
the substrate comprises fused silica; and
the top layer comprises fused silica.

38. A light sensor comprising:
at least one ultra-violet light detector formed on a substrate; and
wherein the at least one ultra-violet light detector comprises:
a cathode formed on the substrate;
a trench formed in the substrate around the cathode, the cathode positioned on an island of substrate at least partially surrounded by the trench;
a spacer formed on the substrate proximate to a perimeter of the trench; and
a top layer having an anode on one surface, situated on the spacer with the anode facing the cathode, and resulting in a cavity containing the cathode and the anode.

39. The sensor of claim 38, wherein the cavity includes the trench.

40. The sensor of claim 39, wherein the at least one ultra-violet detector is a MEMS device.

41. The sensor of claim 40, wherein the cathode and anode have a spacing between them of less than 200 microns.

42. The sensor of claim 41, wherein the cavity comprises a noble gas.

43. The sensor of claim 40, wherein the substrate comprises a plurality of ultra-violet detectors.

44. A light detector comprising:
a cavity;
an anode in said cavity;
a cathode in said cavity spaced from said anode;
wherein said cavity has a pressure of greater than 200 Torr;
wherein the cavity includes a noble gas, and wherein the cathode and the anode are separated by a distance d;
the cavity has a pressure p; and
a product of d and p is within 20 percent of a Paschen value of a breakdown voltage between the cathode and the anode.

45. The light detector of claim 44, wherein:
d is less than 200 microns; and
p is greater than 250 Torr.

46. The light detector of claim 45, wherein:
the cathode comprises a conductor selected from a group consisting of tungsten, copper, nickel, gold, silver, nickel-iron, barium oxide, cesium, hafnium, molybdenum, and the like; and
the anode is conductive and light transparent.

47. The light detector of claim 46, wherein the Paschen value is between 25 and 75 Torr-mm.

48. The light detector of claim 47, wherein the cavity comprises fused silica.

49. The light detector of claim 48, wherein the noble gas is neon.

* * * * *